(12) United States Patent
Vemuri

(10) Patent No.: US 9,657,530 B2
(45) Date of Patent: May 23, 2017

(54) CASING JOINT ASSEMBLY

(71) Applicant: Halliburton Energy Services, Inc., Houston, TX (US)

(72) Inventor: Srinivasa Prasanna Vemuri, Coppell, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 35 days.

(21) Appl. No.: 14/441,260

(22) PCT Filed: Jun. 16, 2014

(86) PCT No.: PCT/US2014/042502
§ 371 (c)(1),
(2) Date: May 7, 2015

(87) PCT Pub. No.: WO2015/195075
PCT Pub. Date: Dec. 23, 2015

(65) Prior Publication Data
US 2016/0258227 A1  Sep. 8, 2016

(51) Int. Cl.
E21B 17/042 (2006.01)
E21B 17/08 (2006.01)
E21B 41/00 (2006.01)
F16L 15/00 (2006.01)
F16L 15/04 (2006.01)

(52) U.S. Cl.
CPC ............ *E21B 17/042* (2013.01); *E21B 17/08* (2013.01); *E21B 41/0042* (2013.01); *F16L 15/00* (2013.01); *F16L 15/04* (2013.01); *F16L 2201/40* (2013.01)

(58) Field of Classification Search
CPC .... E21B 17/042; E21B 17/08; E21B 41/0042; F16L 15/00; F16L 15/04; F16L 2201/40; F16L 13/007; F16L 13/02; F16L 13/0254; F16L 13/0263; F16L 25/0072; F16L 58/181; F16L 58/182
USPC ......................................................... 166/380
See application file for complete search history.

(56) References Cited

U.S. PATENT DOCUMENTS

| 2,128,111 A | 8/1938 | Woods et al. |
| 4,146,060 A | 3/1979 | Garrett |
| 4,273,159 A | 6/1981 | Bolton et al. |

(Continued)

FOREIGN PATENT DOCUMENTS

| WO | 0060343 A1 | 10/2000 |
| WO | 2015195075 A1 | 12/2015 |

OTHER PUBLICATIONS

International Search Report and Written Opinion for PCT/US2014/042502 dated Mar. 16, 2015.

*Primary Examiner* — Taras P Bemko
(74) *Attorney, Agent, or Firm* — McDermott Will & Emery LLP

(57) ABSTRACT

A casing joint assembly includes a casing joint having an upper end and a lower end, and an upper coupling joint having a first portion coupled to an upper casing section and a second portion coupled to the casing joint at the upper end. A joint interface secures the first portion to the second portion. The first portion is made of a first material and the second portion is made of a second material dissimilar to the first material, and an inner coating is applied on an inner radial surface of the upper coupling joint and extending axially across the joint interface.

23 Claims, 3 Drawing Sheets

(56) References Cited

U.S. PATENT DOCUMENTS

| | | | |
|---|---|---|---|
| 4,662,450 A | 5/1987 | Haugen | |
| 5,749,605 A * | 5/1998 | Hampton, III | F16L 25/021 |
| | | | 285/333 |
| 6,273,474 B1 | 8/2001 | DeLange et al. | |
| 6,619,392 B2 | 9/2003 | Marangoni et al. | |
| 6,953,141 B2 | 10/2005 | Haugen | |
| 7,621,323 B2 | 11/2009 | Reavis et al. | |
| 8,678,448 B2 | 3/2014 | Maillon et al. | |
| 2008/0112763 A1 | 5/2008 | Pollack et al. | |
| 2011/0290476 A1* | 12/2011 | Steele | F16L 15/003 |
| | | | 166/242.6 |
| 2012/0032435 A1* | 2/2012 | Carcagno | E21B 17/0423 |
| | | | 285/96 |
| 2012/0038147 A1 | 2/2012 | Mallis et al. | |
| 2012/0175128 A1 | 7/2012 | Brady | |
| 2012/0267093 A1 | 10/2012 | Zimmerman et al. | |

* cited by examiner

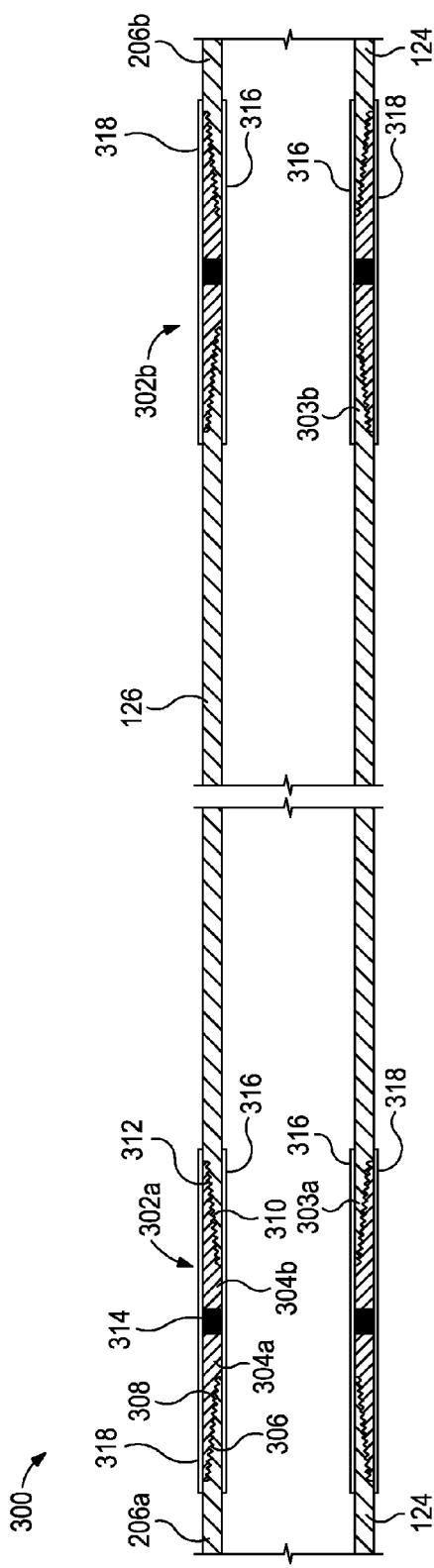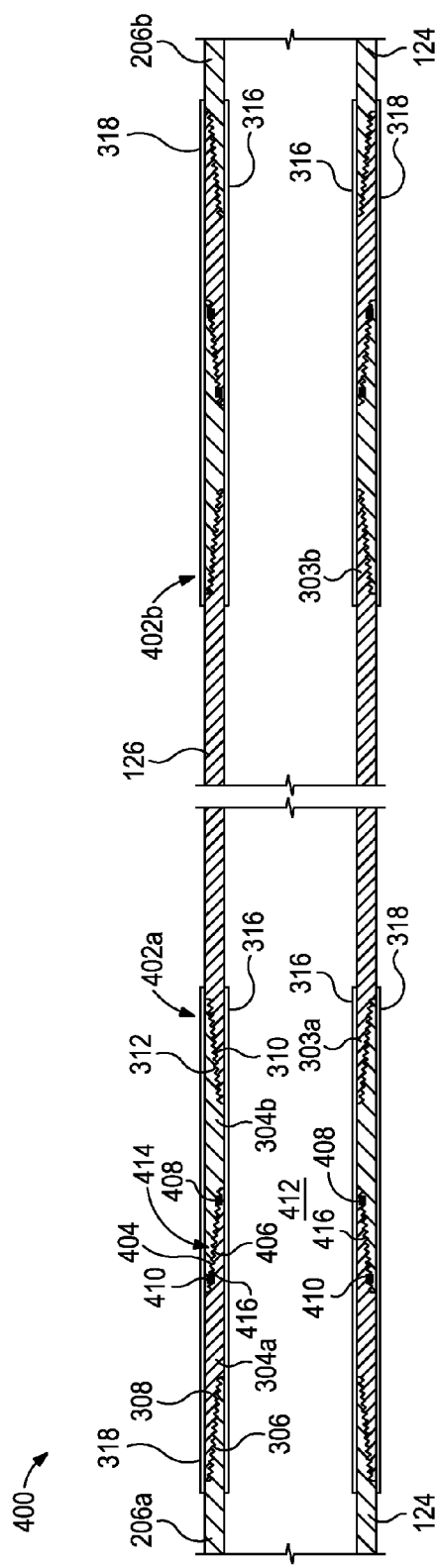

CASING JOINT ASSEMBLY

BACKGROUND

The present disclosure is related to equipment used in conjunction with operations performed in subterranean wells and, more particularly, to corrosion and wear resistant casing joints for a well junction.

Hydrocarbons can be produced through a wellbore traversing a subterranean formation. The wellbore may be a multilateral wellbore that includes a main or parent wellbore and one or more lateral or sidetrack wellbores that extend from the parent wellbore. Typically, once casing string is installed in the parent wellbore, a whipstock can then be lowered into the wellbore and positioned within the casing string at a desired location where a lateral wellbore is to be drilled. One or more mills are then advanced to the whipstock and deflected laterally to penetrate a casing joint arranged within the casing string, thereby forming a window through which a drill bit can form the lateral wellbore.

Casing joints are often made from high-strength materials that are non-corrosive and otherwise able to withstand corrosive downhole fluids that may be present in the subterranean environment, such as hydrogen sulfide and carbon dioxide. Milling the window through such high-strength materials, however, can be difficult and generate debris and/or cuttings that may prevent the whipstock from being retrieved after the window is properly milled into the casing joint. Such debris and/or cuttings may also plug flow control devices, damage seals, obstruct seal bores, and interfere with positioning components in the parent wellbore below the casing joint.

Casing joints with pre-milled windows are sometimes used to reduce or eliminate debris, but typically must include a liner or sleeve to prevent wellbore particulates from entering the inner diameter of the casing string during installation. While the liner can be made of fiberglass, which can be milled easily and result in less debris as compared to drilling through a casing joint made from a high-strength material, fiberglass liners can be susceptible to failure under the high pressures present in the subterranean environment. Accordingly, additional support in the form of an aluminum sleeve may be desired. Aluminum sleeves, however, can prematurely wear while the parent wellbore is being drilled, and the aluminum material may further be susceptible to galvanic corrosion when coupled to steel portions of the casing string. More particularly, the aluminum material may act as an anode when in galvanic contact with steel and generally has lower corrosion and wear resistance than steel.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 3 illustrates a cross-sectional side view of an exemplary casing joint assembly, according to one or more embodiments.

FIG. 4 illustrates a cross-sectional side view of another exemplary casing joint assembly, according to one or more embodiments.

DETAILED DESCRIPTION

The present disclosure is related to equipment used in conjunction with operations performed in subterranean wells and, more particularly, to corrosion and wear resistant casing joints for a well junction.

The embodiments described herein provide a casing joint assembly that includes a casing joint and upper and lower coupling joints, wherein the coupling joints galvanically-isolate the casing joint from upper and lower sections of a string of casing. Each coupling joint includes first and second portions made of dissimilar materials (e.g., metals) and secured together at a joint interface. In some cases, the joint interface may comprise an explosive weld that joins the dissimilar materials. In other cases, the joint interface may be generated through friction stir welding to join the dissimilar materials. Inner and/or outer coatings may be applied across each joint interface in order to enhance the corrosion resistance of the coupling joints, which could otherwise galvanically-corrode upon being subjected to a wellbore environment. As a result, a barrier is generated between the remaining portions of the casing joint and the upper and lower sections of the casing, thereby improving the chances of using aluminum, for example, as part of the casing without compromising the integrity of the casing. The inner and/or outer coatings may further provide a degree of wear resistance to the upper and lower coupling joints and the casing joint.

Advantageously, the embodiments described herein also eliminate the need to orient the casing and the casing joint within a wellbore to a particular angular orientation to generate a casing exit. More particularly, some prior casing joints have a pre-milled casing exit formed therein. The pre-milled casing exit requires the well operator to angularly orient the casing within the wellbore such that the pre-milled casing exit is appropriately arranged in a particular angular direction. According to the present disclosure, however, the galvanically-isolated casing joint does not include a pre-milled casing exit and instead extends about the entire circumference of the wellbore, thereby eliminating the need to angularly orient the casing.

Figure 1:
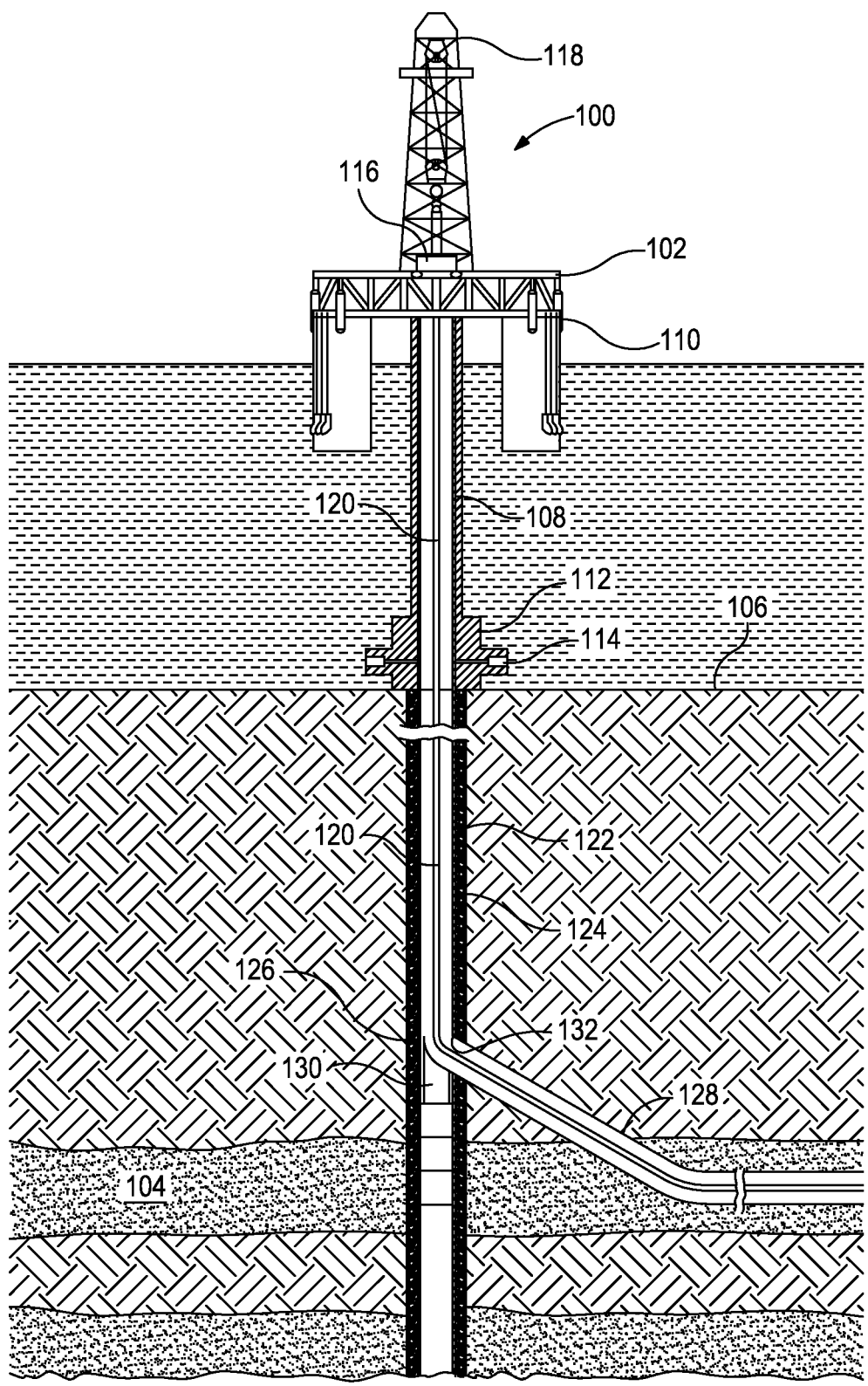
FIG. 1 illustrates an exemplary well system that is able to employ the principles of the present disclosure, according to one or more embodiments.

Referring to FIG. 1, illustrated is an exemplary well system 100 that may employ the principles of the present disclosure, according to one or more embodiments. As illustrated, the well system 100 may include an offshore oil and gas platform 102 centered over a submerged subterranean formation 104 located below the sea floor 106. While the well system 100 is described in conjunction with the offshore oil and gas platform 102, it will be appreciated that the embodiments described herein are equally well suited for use with other types of oil and gas rigs, such as land-based rigs or drilling rigs located at any other geographical site. The platform 102 may be a semi-submersible drilling rig, and a subsea conduit 108 may extend from the deck 110 of the platform 102 to a wellhead installation 112 that includes one or more blowout preventers 114. The platform 102 has a hoisting apparatus 116 and a derrick 118 for raising and lowering pipe strings, such as a drill string 120, within the subsea conduit 108.

As depicted, a main wellbore 122 has been drilled through the various earth strata, including the formation 104. The terms "parent" and "main" wellbore are used herein to designate a wellbore from which another wellbore is drilled.

It is to be noted, however, that a parent or main wellbore is not required to extend directly to the earth's surface, but could instead be a branch of another wellbore. A string of casing 124 is at least partially cemented within the main wellbore 122. The term "casing" is used herein to designate a tubular member or conduit used to line a wellbore. The casing 124 may actually be of the type known to those skilled in the art as "liner" and may be segmented or continuous, such as coiled tubing.

A casing joint 126 may be interconnected between elongate upper and lower lengths or sections of the casing 124 and positioned at a desired location within the wellbore 122 where a branch or lateral wellbore 128 is to be drilled. The terms "branch" and "lateral" wellbore are used herein to designate a wellbore that is drilled outwardly from an intersection with another wellbore, such as a parent or main wellbore. Moreover, a branch or lateral wellbore may have another branch or lateral wellbore drilled outwardly therefrom. A whipstock assembly 130 may be positioned within the casing 124 and secured therein at or near the casing joint 126. The whipstock assembly 130 may operate to deflect one or more cutting tools (i.e., mills) into the inner wall of the casing joint 126 such that a casing exit 132 can be formed therethrough at a desired circumferential location. The casing exit 132 provides a "window" in the casing joint 126 through which one or more other cutting tools (i.e., drill bits) may be inserted to drill and otherwise form the lateral wellbore 128.

It will be appreciated by those skilled in the art that even though FIG. 1 depicts a vertical section of the main wellbore 122, the embodiments described in the present disclosure are equally applicable for use in wellbores having other directional configurations including horizontal wellbores, deviated wellbores, or slanted wellbores. Moreover, use of directional terms such as above, below, upper, lower, upward, downward, uphole, downhole, and the like are used in relation to the illustrative embodiments as they are depicted in the figures, the uphole direction being toward the surface of the well and the downhole direction being toward the toe of the well.

Figure 2:
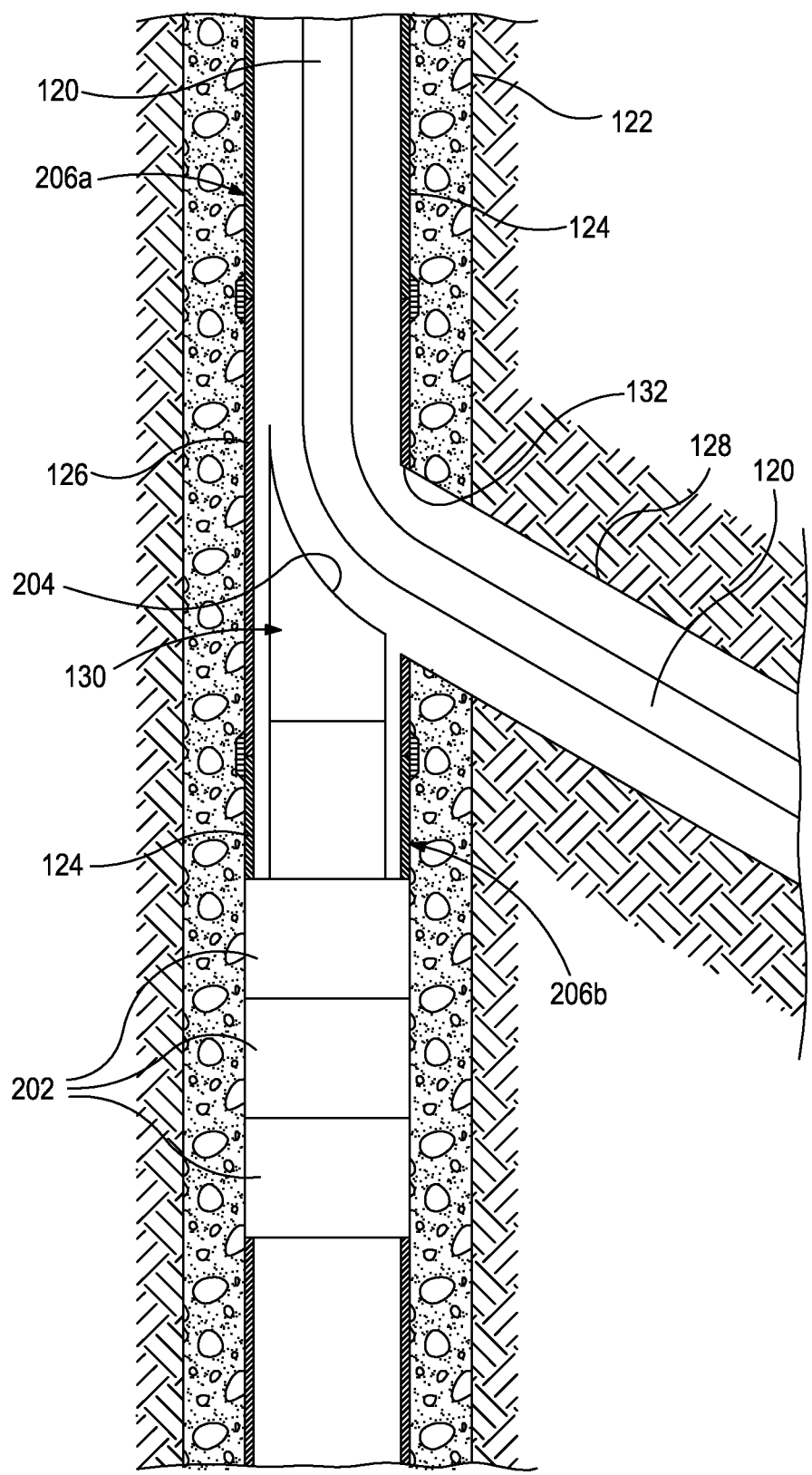
FIG. 2 illustrates an enlarged view of a portion of the wellbore system of FIG. 1.

Referring now to FIG. 2, with continued reference to FIG. 1, illustrated is an enlarged view of the junction or intersection between the main wellbore 122 and lateral wellbore 128. As illustrated, the whipstock assembly 130 may be coupled to or otherwise arranged adjacent various tools and/or tubular lengths 202 either arranged within or interconnected with a portion of the casing 124. Such tools and/or tubular lengths 202 may include, for example, a latch coupling, an alignment bushing, and a casing alignment sub, and may cooperatively determine the appropriate circumferential angle and orientation for the formation of the casing exit 132. As illustrated, the whipstock assembly 130 may include a deflector surface 204 operable to direct a cutting tool, such as a mill, into the sidewall of the casing joint 126 to create the window or casing exit 132 therethrough.

As mentioned above, the casing joint 126 may be coupled to or otherwise arranged within the string of casing 124. More particularly, the casing 124 may include an upper casing section 206a and lower casing section 206b, and the casing joint 126 may be arranged between and otherwise interpose the upper and lower casing sections 206a,b. In some embodiments, each end of the casing joint 126 may be threaded to the upper and lower casing sections 206a,b, respectively.

The casing 124, including the upper and lower casing sections 206a,b, may be made of a corrosive-resistant first material such as, but not limited to, 13-chromium steel, super 13-chromium steel, other stainless steels, API grade steels (e.g., P110, L80, etc.), or a nickel alloy. The casing joint 126, however, may be made of a softer second material dissimilar to the first material and otherwise more easily milled than the first material of the casing 124. The softer casing joint 126 material may help facilitate the formation of the casing exit 132 to initiate the formation of the lateral wellbore 128. Suitable materials for the casing joint 126 include, but are not limited to, aluminum, an aluminum alloy (e.g., 7075 aluminum, 6061 aluminum, or the like), copper, a copper alloy, a magnesium alloy, titanium, free-cutting steel, cast iron, low carbon steel alloys (e.g., 1026 steel alloy, 4140 steel alloy, or the like), combinations thereof, or the like.

When immersed in a conductive electrolyte solution, such as the wellbore environment common within a subterranean environment such as parent wellbore 122, the metal-to-metal contact between the dissimilar metallic materials of the casing joint 126 and the upper and lower casing sections 206a,b may convert the casing joint 126 into an anode that results in galvanic corrosion of the casing joint 126. According to the presently described embodiments, however, the casing joint 126 may be galvanically-isolated from the upper and lower casing sections 206a,b and thereby mitigate or entirely prevent galvanic corrosion of the casing joint 126. More particularly, the casing joint 126 may form part of a casing joint assembly that galvanically-isolates the casing joint 126 from the casing 124. The presently disclosed embodiments of the casing joint assembly may also provide greater wear resistance on the casing joint 126, and thereby enhance the structural integrity and useful life of the casing joint 126.

Referring now to FIG. 3, illustrated is a cross-sectional side view of an exemplary casing joint assembly 300, according to one or more embodiments. The casing joint assembly 300 (hereafter "the assembly 300") may be best understood with reference to FIGS. 1 and 2 where like numerals indicate like components or elements not described again in detail. As illustrated, the assembly 300 may include the casing joint 126 arranged between and otherwise interposing the upper and lower casing sections 206a,b of the casing 124. The assembly 300 may further include an upper coupling joint 302a and a lower coupling joint 302b. The upper coupling joint 302a may interpose and otherwise couple the casing joint 126 to the upper casing section 206a, and the lower coupling joint 302b may interpose and otherwise couple the casing joint 126 to the lower casing section 206b. Accordingly, the upper coupling joint 302a may be coupled to an upper end 303a of the casing joint 126 and the lower coupling joint 302b may be coupled to a lower end 303b of the casing joint 126.

The configuration and operation of the upper and lower coupling joints 302a,b may be the same or substantially similar. Accordingly, the following describes only the configuration and operation of the upper coupling joint 302a. It will be appreciated, however, that the same concepts and description are equally applicable to the lower coupling joint 302b. Moreover, it should be noted that, in at least one embodiment, the assembly 300 may only include the upper coupling joint 302a, without departing from the scope of the disclosure.

The upper coupling joint 302a may be substantially tubular and include an upper or first portion 304a and a lower or second portion 304b. As illustrated, the first portion 304a may be coupled to the upper casing section 206a, and the second portion 304b may be coupled to the upper end 303a of the casing joint 126. More particularly, the first portion 304a may define grooves or threads 306 on an inner radial surface, and the upper casing section 206a may define corresponding grooves or threads 308 on an opposing outer radial surface, whereby the first portion 304a may be threadably attached to the upper casing section 206a. Similarly, the second portion 304b may define grooves or threads 310 on an inner radial surface, and the upper end 303a of the casing joint 126 may define corresponding grooves or threads 312 on an opposing outer radial surface, whereby the second portion 304b may be threadably attached to the casing joint 126.

Advantageously, the threaded portions of the first and second portions 304a,b, the upper casing section 206a, and the casing joint 126 may each be tapered and thereby exhibit smaller cross-sectional thicknesses at their respective axial ends. As a result, the upper coupling joint 302a may be threaded and otherwise coupled at opposing ends to the upper casing section 206a and the casing joint 126 without increasing the diameter of the string of casing 124 at the location of the assembly 300. Moreover, although FIG. 3 depicts the threads 306, 308, 310, 312 as defined on particular radial surfaces (inner or outer) of the upper coupling joint 302a, the upper casing section 206a, and the casing joint 126, it will be appreciated that the threads 306, 308, 310, 312 may alternatively be defined on opposite radial surfaces (inner or outer) of each, without departing from the scope of the disclosure.

The first portion 304a may be made of a material similar to the upper casing section 206a, such as one of the first materials mentioned above with reference to the casing 124. In at least one embodiment, for example, both the first portion 304a and the upper casing section 206a may be made of stainless steel or an alloy thereof. On the other hand, the second portion 304b may be made of a material similar to the casing joint 126, such as one of the second materials mentioned above with reference to the casing joint 126. In at least one embodiment, for example, both the second portion 304b and the casing joint 126 may be made of aluminum an alloy thereof.

The first and second portions 304a,b may be secured together or otherwise bonded and sealed at a joint interface 314 that secures the first portion 304a to the second portion 304b such that the upper coupling joint 302a forms a monolithic, cylindrical structure. In some embodiments, the joint interface 314 may be formed by explosively welding or bonding the first material of the first portion 304a to the second material of the second portion 304b. As known in the art, explosion welding or bonding is a solid-state welding process that can be used for the metallurgical joining of dissimilar metals. The process uses the forces of controlled detonations to accelerate one metal plate (e.g., the first material of the first portion 304a) into another (e.g., the second material of the second portion 304b), thereby creating an atomic bond between the two dissimilar metals. Explosion bonding can introduce thin, diffusion inhibiting interlayers such as tantalum and titanium, which allow conventional weld-up installation and create a vacuum tight seal between the two dissimilar metals. In addition, explosion welding is considered a cold-welding process that allows the dissimilar metals to be joined without losing their pre-bonded metallurgical and atomic crystalline properties. As will be appreciated, explosive bonding may prove advantageous when the material of the second portion 304b is aluminum, which typically cannot withstand high temperature machining or manufacturing processes. Moreover, the short lengths of the first and second portions 304a,b may be amenable to explosive bonding, which is limited by the length or size of the materials being bonded.

In other embodiments, the joint interface 314 may be formed by friction stir welding the first material of the first portion 304a to the second material of the second portion 304b. As generally known in the art, friction stir welding is a solid-state joining process that uses a stirring tool to join one metal plate (e.g., the first material of the first portion 304a) to another dissimilar metal plate (e.g., the second material of the second portion 304b) at opposing facing surfaces. The process involves plunging a rotating stirring tool (i.e., a friction stir welding tool) into a butt joint between the two metal plates or pieces, which plasticizes the metal around it and causes the local metal to coalesce into a sound metallurgical bond. Accordingly, the stirring tool mechanically intermixes the two pieces of metal at the butt joint. The softened metal material (due to the elevated temperature) can then be joined using mechanical pressure, which can be applied by the stirring tool.

In some embodiments, the assembly 300 may further include an inner coating 316 applied on the inner radial surface of the assembly 300. In some embodiments, the inner coating 316 may extend axially across the joint interface 314 between the first and second portions 304a,b. In other embodiments, however, the inner coating 316 may extend axially across the entire upper coupling joint 302a and a short distance into the upper casing section 206a and the casing joint 126, as illustrated. In yet other embodiments, the inner coating 316 may be applied axially across the entire assembly 300, including across the upper and lower coupling joints 302a,b, the casing joint 126, and a short distance into the upper and lower casing sections 206a,b, without departing from the scope of the disclosure.

While depicted in FIG. 3 as having a particular thickness or depth as applied to the inner radial surface(s) of the assembly 300, it will be appreciated that the inner coating 316 may exhibit a thickness ranging between about 0.0015 inches and about 0.15 inches. Accordingly, the thickness of the inner coating 316 as depicted in FIG. 3 should not be considered limiting to the present disclosure but is merely depicted for illustrative purposes.

In some embodiments, the inner coating 316 may be configured to increase the wear resistance across the casing joint 126 and thereby prevent all or a portion of the casing joint 126 from galling or wearing when coming into contact with various downhole tools that traverse the assembly 300. Examples of particular downhole tools that may traverse the assembly 300 include drill pipe, drill collars, drill bits, reamers, stabilizers, tubing, packers, screens, and stimulation tools. The inner coating 316 may resist wear as such downhole tools are rotated, translated, and otherwise tripped through the assembly 300. The inner coating 316, however, may be made of a material that can be milled and/or drilled such that the casing exit 132 (FIGS. 1 and 2) can nonetheless be created in the casing joint 126, as described above.

The inner coating 316 may also serve to increase the corrosion-resistant properties of the assembly 300. For instance, the first portion 304a and the upper casing section 206a may be made of steel, and the second portion 304b and the casing joint 126 may be made of aluminum. At the joint interface 314 where the materials of the first and second portions 304a,b come into direct contact, the second portion 304b may be susceptible to galvanic corrosion upon being immersed in an electrolytic solution, such as the subterranean wellbore environment. More particularly, the material of the second portion 304b may act as an anode within the subterranean wellbore environment, which may include fresh water, chemicals, drilling fluids, completion fluids, brines (e.g., calcium chloride, sodium chloride, potassium chloride, calcium bromide, potassium bromide, etc.), or any combination thereof. The inner coating 316, which may be more corrosion-resistant than the material of the second portion 304b and the casing joint 126, may be applied across all or a portion of the assembly 300 to prevent or mitigate galvanic corrosion. As will be appreciated, however, since the casing joint 126 is not in direct contact with the first portion 304a or the upper casing section 206a, and therefore not subjected to galvanic corrosion in the presence of an electrolyte (i.e., the wellbore environment), the inner coating 316 need not extend across the entire casing joint 126, but may nonetheless do so for purposes of wear-resistance.

The inner coating 316 may take on several forms or otherwise be made of varying materials that provide wear and/or corrosion resistance to the assembly 300. The inner coating 316, for instance, may be a material that is non-conductive when in service conditions. In at least one embodiment, the inner coating 316 may be an anodized coating, a layer of anodized material, or otherwise generated by anodizing processes known to those skilled in the art. The inner coating 316 may comprise materials such as, but not limited to, ceramics, metals, polymers, epoxies, elastomers, or any combination thereof. Examples of suitable inner coatings 316 include an epoxy-phenolic material (e.g., TUBEKOTE® or TK-34AL), an epoxy and polyphenylene sulfide composite material, a synergistic coating (e.g., MAGNAPLATE HCR®), polytetrafluoroethylene TEFLON®), an epoxy coating (e.g., 3M® SCOTCHKOTE™), aluminum oxide (e.g., SAFEGUARD® CC-5000 chromate-free inorganic seal), a highly-polished ceramic coating, a thermal spray coating, molybdenum sulfide, an electrostatic powder coating (e.g., FLEXICORE®), a tungsten carbide coating, a fluoropolymer coating (e.g., XYLAN®), a thermally sprayed metal or ceramic coating combined with fluoropolymers (e.g., PLASMACOAT™), an electroceramic coating (e.g., ALODINE® EC$^2$™), and any combination thereof.

The inner coating 316 may be applied using any suitable processes known to those of skill in the art. Examples of suitable coating processes include, but are not limited to, soft anodize coating, anodized coating, electroless nickel plating, hard anodized coating, ceramic coatings, carbide beads coating, plastic coating, thermal spray coating, high velocity oxygen fuel (HVOF) coating, a nano HVOF coating, a metallic coating. In some embodiments, sacrificial anodes may also be used.

In some embodiments, as illustrated, the assembly 300 may further include an outer coating 318 applied on the outer radial surface of the assembly 300. The outer coating 318 may be made of the same materials as the inner coating 316 described above, and may serve substantially the same purposes on the exterior of the assembly 300. The outer coating 318 may further be applied in a similar manner as the inner coating 318. Similar to the inner coating 316, the outer coating 318 may extend across the joint interface 314 between the first and second portions 304a,b. Alternatively, the outer coating 318 may extend axially across the entire upper coupling joint 302a and a short distance along the upper casing section 206a and the casing joint 126, as illustrated. In yet other embodiments, the outer coating 318 may be applied axially across the entire assembly 300, including across the upper and lower coupling joints 302a,b, the casing joint 126, and a short distance along the upper and lower casing sections 206a,b, without departing from the scope of the disclosure. Moreover, as with the inner coating 316, the thickness or depth of the outer coating 318, as depicted in FIG. 3, is for illustrative purposes only and therefore should not be considered limiting to the present disclosure. Rather, the thickness of the outer coating 318 may range between about 0.015 inches and about 0.15 inches.

Referring now to FIG. 4, with continued reference to FIG. 3, illustrated is another exemplary casing joint assembly 400, according to one or more embodiments. The casing joint assembly 400 (hereafter "the assembly 400") may be similar in some respects to the assembly 300 of FIG. 3 and therefore may be best understood with reference thereto, where like numerals indicate like components or elements not described again in detail. Similar to the assembly 300 of FIG. 3, the assembly 400 may include the casing joint 126 arranged between and otherwise interposing the upper and lower casing sections 206a,b of the casing 124.

More particularly, the assembly 400 may further include an upper coupling joint 402a and a lower coupling joint 402b. The upper and lower coupling joints 402a,b may be similar to the upper and lower coupling joints 302a,b of FIG. 3 in that the upper coupling joint 402a may interpose and otherwise couple the casing joint 126 to the upper casing section 206a, and the lower coupling joint 402b may interpose and otherwise couple the casing joint 126 to the lower casing section 206b. Since the configuration and operation of the upper and lower coupling joints 402a,b are the same or substantially similar, the following describes only the configuration and operation of the upper coupling joint 402a. It will be appreciated, however, that the following concepts and description are equally applicable to the lower coupling joint 402b, without departing from the scope of the disclosure.

The upper coupling joint 402a may include the first and second portions 304a,b as generally described above. In some embodiments, the first portion 304a may be threaded to the upper casing section 206a via corresponding threads 306, 308, and the second portion 304b may be threaded to the upper end 303a of the casing joint 126 via corresponding threads 310, 312. In at least one embodiment, both the first portion 304a and the upper casing section 206a may be made of stainless steel or an alloy thereof, and both the second portion 304a and the casing joint 126 may be made of aluminum or an alloy thereof.

The first and second portions 304a,b of the upper coupling joint 402a may be coupled at a joint interface 414. Similar to the joint interface 314 of FIG. 3, the joint interface 414 may be configured to secure the first portion 304a to the second portion 304b such that the upper coupling joint 402a forms a monolithic, cylindrical structure. Unlike the joint interface 314 of FIG. 3, however, the joint interface 414 may comprise a threaded interface between the first and second portions 304a,b. More specifically, the joint interface 414 may include grooves or threads 404 defined on an outer radial surface of the first portion 304a and corresponding grooves or threads 406 defined on an opposing inner radial surface of the second portion 304b, whereby the first portion 304a may be threadably attached to the second portion 304b.

Advantageously, the ends of the first and second portions 304a,b that provide or define the threads 404, 406, respectively, may each be tapered and thereby exhibit smaller cross-sectional thicknesses at their respective axial ends. As a result, the first and second portions 304a,b may be threadably engaged at the joint interface 414 without increasing the diameter of the string of casing 124 at the location of the upper coupling joint 402a. Moreover, although FIG. 4 depicts the threads 404, 406 as defined on the inner and outer radial surfaces of the first and second portions 304a,b, respectively, the threads 404, 406 may alternatively be defined on opposite radial surfaces (inner or outer) of the first and second portions 304a,b, without departing from the scope of the disclosure.

Similar to the assembly 300 of FIG. 3, in some embodiments, the assembly 400 may further include the inner and outer coatings 316, 318 applied on the inner and outer radial surfaces, respectively, of the assembly 400 to increase wear resistance across the casing joint 126 and/or increase the corrosion-resistant properties of the assembly 400. In embodiments where the first portion 304a is made of steel, for instance, and the second portion 304b is made of aluminum, the second portion 304b may be susceptible to galvanic corrosion at the joint interface 414 where the first and second portions 304a,b come into direct contact. The inner and outer coatings 316, 318 may mitigate the effects of galvanic corrosion by isolating the joint interface 414 from contact with an electrolytic solution (i.e., the wellbore environment).

In some embodiments, the inner and outer coatings 316, 318 may extend axially across the joint interface 414 between the first and second portions 304a,b. In other embodiments, however, the inner and outer coatings 316, 318 may extend axially across the entire upper coupling joint 402a and a short distance into the upper casing section 206a and the casing joint 126, as illustrated. In yet other embodiments, the inner and outer coatings 316, 318 may be applied axially across the entire assembly 400, including across the upper and lower coupling joints 402a,b, the casing joint 126, and a short axial distance into the upper and lower casing sections 206a,b, without departing from the scope of the disclosure.

In some embodiments, the joint interface 414 between the first and second portions 304a,b may further be sealed and otherwise coated to mitigate corrosion at the joint interface 414 where the first and second portions 304a,b come into direct contact. More particularly, the assembly 400 may further include one or more inner sealing members 408 (one shown) and one or more outer sealing members 410 (one shown). The inner and outer sealing members 408, 410 may be pressure seals configured to prevent fluids from migrating into the threaded interface between the first and second portions 304a,b. As illustrated, for instance, the inner sealing member 408 may be disposed and otherwise arranged between the first and second portions 304a,b and configured to prevent fluids within an interior 412 of the casing 124 from migrating into the threaded interface between the first and second portions 304a,b. Similarly, the outer sealing member 410 may be disposed and otherwise arranged between the first and second portions 304a,b and configured to prevent fluids present outside of the casing 124 from migrating into the threaded interface between the first and second portions 304a,b.

The inner and outer sealing members 408, 410 may comprise a material selected from the following: elastomeric materials, non-elastomeric materials, metals, composites, rubbers, ceramics, derivatives thereof, and any combination thereof. In some embodiments, the inner and outer sealing members 408, 410 may be O-rings or the like. In other embodiments, however, the inner and outer sealing members 408, 410 may be a set of v-rings or CHEVRON® packing rings, or other appropriate seal configurations (e.g., seals that are round, v-shaped, u-shaped, square, oval, t-shaped, etc.), as generally known to those skilled in the art, or any combination thereof.

In some embodiments, the assembly 400 may further include a thread coating 416 applied to the threaded interface of the first and second portions 304a,b where the threads 404, 406 come into direct contact. In some embodiments, the thread coating 416 may be applied to the threads 404 of the first portion 304a. In other embodiments, the thread coating 416 may be applied to the threads 406 of the second portion 304b. In yet other embodiments, the thread coating 416 may be applied to both threads 404, 406, without departing from the scope of the disclosure. The thread coating 416 may be similar to the inner and outer coatings 316, 318 and otherwise made of similar materials to provide corrosion resistance to the threaded interface between the first and second portions 304a,b.

The thread coating 416, for instance, may be a material that is non-conductive when in service conditions. In at least one embodiment, the thread coating 416 may be a layer of anodized material or otherwise generated by an anodizing process. The thread coating 416 may comprise materials such as, but not limited to, ceramics, metals, polymers, epoxies, elastomers, and any combination thereof. Examples of a suitable thread coating 416 may be similar to the examples provided above for the inner coating 316, and therefore will not be listed again. In other embodiments, however, the thread coating 416 may comprise a thread-locking compound, such as WELD A™ thread compound available from Halliburton Energy Services, and TORQ-LOK® available from Blok-Lok. Moreover, the thread coating 416 may be applied using any of the processes mentioned above with respect to applying the inner coating 316.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A casing joint assembly, comprising:
   a casing joint having an upper end and a lower end;
   a cylindrical upper coupling joint configured to axially interpose an upper casing section and the upper end of the casing joint, the upper coupling joint having a first portion threadable to the upper casing section and a second portion threaded to the casing joint at the upper end, wherein the casing joint assembly has a constant inner diameter and a constant outer diameter extending between the upper casing section and the upper end of the casing joint;
   a joint interface securing the first portion to the second portion, wherein the first portion is made of a first material and the second portion is made of a second material dissimilar to the first material; and
   an inner coating applied to the constant inner diameter of the upper coupling joint and extending axially across at least the joint interface.

2. The casing joint assembly of claim 1, wherein the first material is selected from the group consisting of stainless steel and a nickel alloy.

3. The casing joint assembly of claim 1, wherein the second material is selected from the group consisting of aluminum, an aluminum alloy, copper, a copper alloy, a magnesium alloy, titanium, free-cutting steel, cast iron, a low carbon steel alloy, and any combinations thereof.

4. The casing joint assembly of claim 1, wherein the inner coating is at least one of an anodized coating, a ceramic, a metal, a polymer, an epoxy, an elastomer, molybdenum sulfide, tungsten carbide, a fluoropolymer, an electrostatic powder, and any combination thereof.

5. The casing joint assembly of claim 1, wherein the joint interface is formed by at least one of explosive welding and friction stir welding.

6. The casing joint assembly of claim 1, wherein the joint interface is a threaded interface where the first portion is threadably attached to the second portion.

7. The casing joint assembly of claim 6, further comprising one or more sealing members arranged within the threaded interface to prevent an influx of fluids into the threaded interface.

8. The casing joint assembly of claim 6, further comprising a thread coating applied to the threaded interface, the thread coating comprising a material selected from the group consisting of an anodized material, a ceramic, a metal, a polymer, an epoxy, an elastomer, molybdenum sulfide, tungsten carbide, a fluoropolymer, an electrostatic powder, a thread-locking compound, and any combination thereof.

9. The casing joint assembly of claim 1, further comprising:
   a cylindrical lower coupling joint configured to axially interpose a lower casing section and the lower end of the casing joint, the lower coupling joint having a lower first portion threadable to a lower casing section and a lower second portion threaded to the casing joint at the lower end; and
   a second joint interface securing the lower first portion to the lower second portion, wherein the lower first portion is made of the first material and the lower second portion is made of the second material.

10. A well system, comprising:
    a string of casing arranged within a wellbore and having an upper casing section and a lower casing section;
    a casing joint arranged within the wellbore and interposing the upper and lower casing sections, the casing joint having an upper end and a lower end;
    a cylindrical upper coupling joint axially interposing the upper casing section and the upper end of the casing joint, the upper coupling joint having a first portion threaded to the upper casing section and a second portion threaded to the upper end of the casing joint, wherein the first and second portions of the upper coupling joint are secured together at an upper joint interface;
    a cylindrical lower coupling joint having a first portion coupled to the lower casing section and a second portion coupled to the lower end of the casing joint, wherein the first and second portions of the lower coupling joint are secured together at a lower joint interface wherein the string of casing has a constant inner diameter and a constant outer diameter extending between the upper and lower casing sections and across the upper and lower coupling joints; and
    an inner coating applied to the constant inner diameter of the string of casing and extending axially across at least the upper and lower joint interfaces, and
    wherein each first portion of the upper and lower coupling joints is made of a first material and each second portion of the upper and lower coupling joints is made of a second material dissimilar to the first material.

11. The well system of claim 10, wherein the first material is selected from the group consisting of stainless steel and a nickel alloy.

12. The well system of claim 10, wherein the second material is selected from the group consisting of aluminum, an aluminum alloy, copper, a copper alloy, a magnesium alloy, titanium, free-cutting steel, cast iron, a low carbon steel alloy, and any combinations thereof.

13. The well system of claim 10, wherein the inner coating is at least one of an anodized coating, a ceramic, a metal, a polymer, an epoxy, an elastomer, molybdenum sulfide, tungsten carbide, a fluoropolymer, an electrostatic powder, and any combination thereof.

14. The well system of claim 10, wherein the upper and lower joint interfaces are formed by at least one of explosively welding and friction stir welding the first portion to the second portion.

15. The well system of claim 10, wherein at least one of the upper and lower joint interfaces is a threaded interface where the first portion is threadably attached to the second portion.

16. The well system of claim 15, further comprising at least one of one or more sealing members arranged within the threaded interface and a thread coating applied to the threaded interface.

17. A method, comprising:
    arranging a string of casing within a wellbore, the string of casing having an upper casing section, a lower casing section, and a casing joint interposing the upper and lower casing sections, wherein the casing joint has an upper end and a lower end; and galvanically-isolating the casing joint from the upper and lower casing sections with a cylindrical upper coupling joint and a cylindrical lower coupling joint, the upper coupling joint axially interposing the upper casing section and the upper end of the casing joint and having a first portion threaded to the upper casing section and a second portion threaded to the upper end of the casing joint, and the lower coupling joint axially interposing the lower casing section and the lower end of the casing joint and having a first portion threaded to the lower casing section and a second portion threaded to the lower end of the casing joint, wherein the string of casing has a constant inner diameter and a constant outer diameter extending between the upper and lower casing sections and across the upper and lower coupling joints;

sealing the constant inner diameter of the string of casing with an inner coating applied on and extending axially across at least the upper and lower joint interfaces;

wherein the first and second portions of the upper and lower coupling joints are each secured together at corresponding joint interfaces, and wherein each first portion of the upper and lower coupling joints is made of a first material and each second portion of the upper and lower coupling joints is made of a second material dissimilar to the first material.

18. The method of claim 17, wherein the first material is at least one of stainless steel and a nickel alloy, and wherein the second material is selected from the group consisting of aluminum, an aluminum alloy, copper, a copper alloy, a magnesium alloy, titanium, free-cutting steel, cast iron, a low carbon steel alloy, and any combinations thereof.

19. The method of claim 17, wherein the inner coating is at least one of an anodized coating, a ceramic, a metal, a polymer, an epoxy, an elastomer, molybdenum sulfide, tungsten carbide, a fluoropolymer, an electrostatic powder, and any combination thereof.

20. The method of claim 17, further comprising forming the upper and lower joint interfaces by at least one of explosively welding and friction stir welding the first portion to the second portion.

21. The method of claim 17, wherein at least one of the upper and lower joint interfaces is a threaded interface where the first portion is threadably attached to the second portion.

22. The method of claim 21, further comprising preventing an influx of fluids into the threaded interface with one of one or more sealing members arranged within the threaded interface.

23. The method of claim 22, wherein galvanically-isolating the casing joint from the upper and lower casing sections further comprises sealing the threaded interface with a thread coating applied to the threaded interface.

* * * * *